United States Patent
Komori et al.

(10) Patent No.: US 7,025,505 B2
(45) Date of Patent: Apr. 11, 2006

(54) FLUID BEARING DEVICE

(75) Inventors: Isao Komori, Kuwana (JP); Seiji Shimizu, Aichi-ken (JP); Masaharu Hori, Kuwana (JP); Fuminori Satoji, Kuwana (JP); Kenji Ito, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/420,542

(22) Filed: Apr. 21, 2003

(65) Prior Publication Data
US 2004/0017954 A1    Jan. 29, 2004

(30) Foreign Application Priority Data

| Apr. 23, 2002 | (JP) | 2002-120619 |
| May 30, 2002 | (JP) | 2002-157909 |
| Jun. 5, 2002 | (JP) | 2002-164680 |
| Sep. 20, 2002 | (JP) | 2002-275484 |

(51) Int. Cl.
*F16C 17/10*    (2006.01)

(52) U.S. Cl. .................. 384/107; 384/119

(58) Field of Classification Search .......... 384/107, 384/100, 114, 124, 112, 113
See application file for complete search history.

(56) References Cited

U.S. PATENT DOCUMENTS 5,708,520 A * 1/1998 Yoshitsugu et al. ......... 384/100
5,998,898 A * 12/1999 Fukutani et al. ............ 384/114

FOREIGN PATENT DOCUMENTS

| JP | 04-008909 | 1/1992 |
| JP | 08-103047 | 4/1996 |
| JP | 2003-130043 | 5/2003 |
| WO | WO 03/027521 | 4/2003 |

* cited by examiner

*Primary Examiner*—Lenard A. Footland
(74) *Attorney, Agent, or Firm*—J. C. Patents (57) ABSTRACT

The housing made of a resin composition is formed by injection molding with a sintered metal bearing sleeve as an insert piece. The housing includes a cylindrical body part, a sealing portion extending from the top of the body part radially inwards, and a bottom part closing the lower end of the body part. Of these, the body part and bottom part are integrally formed, to which the sealing portion is welded.

23 Claims, 10 Drawing Sheets

FLUID BEARING DEVICE

BACKGROUND OF THE INVENTION

1. Field of the Invention

The present invention relates to a fluid bearing device that supports a rotating member by an oil film formed in a bearing gap. The fluid bearing device of the invention is suitably used in spindle motors of magnetic and/or optical information equipment such as HDDs, FDDs, CD- or DVD-ROM drives, MD or MO drives, polygon scanner motors of laser beam printers, or other small motors in various electrical equipment such as axial-flow fans.

2. Description of the Related Art

The motors mentioned above must satisfy various requirements such as high rotation precision, high speed, low cost, and low noise. Motor spindle bearing is one of the constituent elements that determine required motor performance. Fluid bearings, particularly dynamic bearings, are considered to have excellent characteristics in many respects with regard to the required motor performance and some have found actual applications in recent years.

Fluid bearings are generally classified into two categories: One is the dynamic bearing, which includes means for generating dynamic pressure of lubricating oil in a bearing gap. The other is the cylindrical bearing, whose bearing surface forms a true circle, and which has no such dynamic-pressure generating means.

A fluid bearing device incorporated in a spindle motor of a disk device such as a HDD or in a polygon scanner motor of a laser beam printer normally includes a radial bearing part for rotatably supporting a shaft member in a radial direction and a thrust bearing part for rotatably supporting the same in a thrust direction. Of these, at least the radial bearing part is a dynamic bearing having dynamic-pressure generating grooves in the bearing surface. These grooves are formed on either one of an inner peripheral surface of a bearing sleeve and an outer peripheral surface of the shaft member.

The bearing sleeve is normally fixed to the inner periphery of a housing by means of press-fitting or bonding. The housing is usually provided with a sealing member at its open end so as to prevent leakage of lubricating oil that fills the inside of the housing.

Various efforts have been made to enhance the machining and assembling precision of respective components constituting the fluid bearing device such as the housing, bearing sleeve, shaft member, and sealing member, so as to achieve high bearing performance for satisfying the increasingly demanding performance requirements of the information equipment industry. On the other hand, with the trend towards lower prices of the information equipment, the demands for cost reduction of such fluid bearing devices are intensifying.

BRIEF SUMMARY OF THE INVENTION

A primary object of the present invention is to reduce the costs of such a fluid bearing device.

Another object of the invention is to enhance forming precision and functionality of the housing of the fluid bearing device.

Yet another object of the invention is to achieve more reliable bearing performance and to improve machining precision and assembling precision of the housing of the fluid bearing device.

A further object of the invention is to provide a fluid bearing device which is constructed with fewer components and at lower costs yet highly reliable.

To achieve the above objects, the present invention provides a fluid bearing device including a housing, and a bearing sleeve fixed to an inner periphery of the housing, the bearing sleeve forming a radial bearing gap with respect to an outer peripheral surface of the shaft member, the fluid bearing device supporting the shaft member and the bearing sleeve in a radial direction in a non-contact manner by an oil film formed in the radial bearing gap, wherein the housing is a resin product. Resin housings can be formed by a resin molding process such as injection molding and thus can be manufactured at lower cost than metal housings fabricated by a machining process such as grinding. Relatively high precision is also achieved as compared to metal housings fabricated by a pressing process or the like.

In the above construction, the housing may be a resin product formed by welding a plurality of parts together.

The resin housing can be formed by molding resin with a bearing sleeve made of, for example, sintered metal or the like as an insert piece. By making the housing a one-piece mold having a sealing portion, a body part, and a bottom part, the number of components is reduced, and so can be the number of process steps, because the molding of the housing and fixing of the bearing sleeve to the housing are achieved at the same time. On the other hand, it may be harder to secure a high degree of molding precision of the housing because of the difficulty in achieving uniform shrinkage rate of resin due to the complex structure of the housing including the sealing portion, the body part, and the bottom part, and due to the fact that shrinkage rate of a portion of resin contacting the sintered metal bearing sleeve differs from those of other portions. Also, it may be difficult to satisfy higher levels of various different needs for each part of the housing such as the sealing portion, body part, and bottom part, if they are all formed of the same resin composition.

By constructing the housing with a plurality of parts welded together, its constituent parts can respectively be formed of a suitable resin composition whose material, composition, and shape may be selected according to the specific needs for each constituent part. A housing of a complex shape can be formed by combining parts of a simple shape to each other. Also, separate parts may be prepared according to whether the resin is in contact with the bearing sleeve or not. Thus the shrinkage rate of resin during the curing process can be made uniform in each separate part, whereby the housing can be formed to a higher degree of precision.

By forming these separate parts from different resin compositions suitably selected in accordance with their specific requirements, respectively, the overall functionality of the housing can be improved. In this case, the different resin compositions should preferably contain a common base resin material so as to make sufficiently strong welds and to improve welding operability.

The housing may include, for example, a cylindrical body part having open opposite ends, a bottom part for closing one end of the body part, and a sealing portion provided to the other end of the body part for forming a sealing gap between itself and an outer peripheral surface of the shaft member. By forming the sealing portion integrally with the housing, the number of components and process steps is reduced, thereby achieving a reduction in cost, as compared to a conventional structure in which a separate sealing member is press-fitted or bonded to an inner periphery at one end of the housing.

Alternatively, the body part, sealing portion, and bottom part may separately be prepared and welded together to form the housing, or, the body part and either one of the sealing portion and bottom part may be pre-formed as one-piece and welded to the other one.

In either case, at least the body part is molded with the bearing sleeve as an insert piece, i.e., the fixing of the bearing sleeve in the housing is carried out simultaneously with the molding of the housing, whereby the number of process steps is reduced.

Because the requirements for the body part, sealing portion, and bottom part of the housing differ from each other, it is preferable to use a suitable resin composition for each of the different parts so as to meet their respective requirements.

For example, the body part is required to have high strength to maintain its precision for a long time. Thus it should preferably be formed of a resin composition comprising a thermoplastic resin as a base resin and a reinforcing material mixed thereto.

The bottom part making contact with the shaft member is required to have the characteristics that will reduce wear and friction resistance between itself and the shaft member. Thus it should preferably be formed of a resin composition comprising thermoplastic resin as a base resin and a solid lubricant mixed thereto.

The sealing portion is desired to prevent oil leakage from the housing and water penetration from outside in a reliable manner. Thus it should preferably be formed of a resin composition comprising thermoplastic resin as a base resin and having a water contact angle of 80° or more.

In a fluid bearing device in which the shaft member is supported at its bottom in a thrust direction by a thrust bearing part provided at the bottom of the housing, there is a possibility that pressure rises in the lubricating fluid around the thrust bearing part to a higher level than that around the sealing portion. This generates pressure difference between the portions around the thrust bearing part and around the sealing portion. Such pressure difference creates a local negative pressure in the lubricating fluid inside the housing, causing formation of air bubbles in the lubricating fluid, which may induce fluid leakage or cause vibration. The pressure rise in the lubricating fluid around the thrust bearing part may also lift up the shaft member. Such problems can be obviated by providing a connecting groove that communicates the thrust bearing part to the sealing portion. When pressure rises in the lubricating fluid around the thrust bearing part, the fluid flows from the vicinity of the thrust bearing apart through the connecting groove towards the sealing portion, whereby the fluid pressure around the thrust bearing part and that around the sealing portion are maintained equal.

The connecting groove may be formed, for example, by a first radial groove provided between the bottom surface of the housing and one end surface of the bearing sleeve, an axial groove provided between an inner peripheral surface of the housing and an outer peripheral surface of the bearing sleeve, and a second radial groove provided between an inner surface of the sealing portion and the other end surface of the bearing sleeve.

To achieve the above objects, the present invention also provides a fluid bearing device including a housing, and a bearing sleeve made of sintered metal and fixed to an inner peripheral surface of the housing, the bearing sleeve forming a radial bearing gap with respect to an outer peripheral surface of the shaft member, the fluid bearing device supporting the shaft member and the bearing sleeve in a radial direction in a non-contact manner by an oil film formed in the radial bearing gap during relative rotation between the shaft member and the bearing sleeve, wherein the housing is formed of a resin composition having a crystallinity of 20% or more.

The housing made of a resin composition having a crystallinity of 20% or more will hardly absorb the lubricating oil as a lubricating fluid. Accordingly, the amount of lubricating oil filled in the housing is kept stably, whereby the bearing performance is well maintained for a long time.

Sintered metal material for the bearing sleeve is a porous metal and obtained by mixing a metal powders, then forming the mixture, and then sintering the formed body. Such sintered metal has a porous structure with a multiplicity of internal pores as well as surface pores at which the internal pores communicate to the outer surface. The metal powders may comprise, for example, at least one material selected from the group consisting of copper, iron, and aluminum powders, to which powders of any one of tin, zinc, lead, graphite, molybdenum disulfide, and a metal alloy of these, may be added as required. The sintered metal bearing sleeve is used in an oil-impregnated state.

Preferably, the resin component should have a water absorption rate of 0.5% or less.

Also, the resin component should preferably have a linear expansion coefficient of $5\times10^{-5}/°$ C. or less.

By mixing 10 to 80 parts by weight of reinforcing material with respect to 100 parts by weight of the resin composition, the housing can have enhanced strength, and precision degradation of dynamic-pressure generating grooves caused by deformation of the housing can be avoided.

The shaft member may also be supported in the thrust direction in a non-contact manner by an oil film formed in a thrust bearing gap, or by making contact with the bottom part of the housing in the thrust direction.

If the bearing device has a structure in which the shaft member is supported in the thrust direction by the bottom part of the housing, then it is preferable to mix 5 to 30 parts by weight of solid lubricant with respect to 100 parts by weight of the resin component.

The above described housing can be molded with the bearing sleeve as an insert piece.

To achieve the above objects, the present invention also provides a fluid bearing device comprising a housing made of resin having a bottom part at one end thereof, a bearing sleeve made of metal provided inside the housing, a shaft member inserted in a space formed by an inner peripheral surface of the bearing sleeve, a radial bearing part provided between the inner peripheral surface of the bearing sleeve and an outer peripheral surface of the shaft member for supporting the shaft member in a radial direction in a non-contact manner by a lubricating oil film formed in a bearing gap, and a thrust bearing part provided on the bottom part of the housing for supporting one end surface of the shaft member in a thrust direction, wherein the housing is molded by a resin with the bearing sleeve as an insert piece, and the bearing sleeve includes a chamfered portion at least at an inner peripheral portion at one end thereof, the chamfered portion being provided with separation prevention means for preventing separation of the resin forming the housing therefrom.

The resin housing can be formed by insert molding of a resin with the bearing sleeve as an insert piece. The production cost for the housing is thus made lower than that of metal housings. The thrust bearing part can be configured such that one end surface of the shaft member is supported directly by the bottom part of the housing, whereby a thrust plate that is normally provided in the conventional type of fluid bearing device can be omitted. Thus the number of components is reduced. Also, the assembling cost is reduced because the process of assembling the bearing sleeve in the housing is omitted.

The inner periphery at both ends of the bearing sleeve is normally formed as a chamfered corner. The chamfered corner, particularly the one at the inner periphery of the bearing sleeve on the bottom side of the housing has a function of securing a certain volume of space in the gap between itself and the inner mold that is fitted with the inner peripheral surface of the bearing sleeve when insert molding the housing and bearing sleeve, so as to prevent formation of minute burrs of resin filled in that gap. As molten resin cures in the cavity formed by the molds, an internal stress caused by shrinkage of the resin is developed radially inwards in part of the resin forming the bottom part of the housing, which internal stress acts in such a direction as to peel the resin from the chamfered portion at the inner periphery at one end of the bearing sleeve. To overcome this problem, the chamfered portion in the present invention is provided with the separation prevention means for preventing the resin forming the housing from being peeled off, whereby unfavorable effects of resin separation from the chamfered portion are avoided and reliability of the fluid bearing device is improved.

Such separation prevention means can be provided, for example, by forming the bearing sleeve with sintered metal having a larger surface porosity rate in the chamfered portion than that of the inner peripheral surface of the bearing sleeve.

The above sintered metal can be obtained by sintering a molded mixture of metal powders, for example, one selected from the group consisting of copper, iron, and aluminum powders, coated metal powder such as copper-coated iron powder, and metal alloy powders, to which powders of any one of tin, zinc, lead, graphite, molybdenum disulfide, and a metal alloy powder of these, may be added as required. Such sintered metal has a porous structure with a multiplicity of internal pores as well as surface pores at which internal pores communicate to the outer surface.

When molding the housing by a resin with the sintered metal bearing sleeve as an insert piece, molten resin penetrates from the surface pores on the sleeve surface exposed in the cavity formed by the molds, and into the internal pores in surface layers of the bearing sleeve. As the resin cures, it provides an anchoring effect that keeps the resin firmly on the surface of the bearing sleeve. By making the aforementioned chamfered portion to have a larger surface porosity rate than the inner peripheral surface of the bearing sleeve, this anchoring effect is enhanced in the chamfered portion, whereby resin separation therefrom is effectively prevented. Such surface porosity rate setting may also be applied to other surfaces of the bearing sleeve with which resin makes tight contact, such as outer peripheral surface and end surfaces.

The "surface porosity rate" is the rate of the total area of surface pores per unit area, and measured under the following conditions:

[Measuring Equipment]
  Metal microscope: Nikon ECLIPSS ME600
  Digital camera: Nikon DXM1200
  Imaging software: Nikon ACT-1 ver.1
  Image processing software: INOTEC QUICK GRAIN

[Measuring Conditions]
  Photographing: Shutter speed 0.5 sec.
  Binary conversion threshold: 235

Alternatively, the bearing sleeve may be formed of a normal metal material having no porous structure or very small porosity rate, in which case such separation prevention means may be provided by forming the chamfered portion to have a larger surface roughness than that of the inner peripheral surface of the bearing sleeve. The metal material may be, for example, stainless steel, copper alloy, brass, and the like.

By making the surface roughness of the chamfered portion larger than the inner peripheral surface of the bearing sleeve, molten resin can penetrate into minute pits on the surface during the molding of the housing, and as it cures, it provides the anchoring effect that will retain the resin firmly on the surface of the chamfered portion. Thus resin separation from the chamfered portion is effectively prevented. Such surface roughness setting may also be applied to other surfaces of the bearing sleeve with which resin makes tight contact, such as outer peripheral surface and end surfaces.

As one option, the chamfered portion may be formed with a recess so as to further enhance this separation preventing effect. Such recess may be formed, for example, as grooves, notches, and dents. Such recess increases the area in which the resin makes tight contact with the chamfered portion, whereby the separation preventing effect is further enhanced. Depending on the shape of the recess, it can also contribute to the separation prevention by the engagement with the resin.

To achieve the above objects, the present invention also provides a fluid bearing device comprising a housing made of resin having a bottom part at one end thereof, a bearing sleeve made of metal provided inside the housing, a shaft member inserted in a space formed by an inner peripheral surface of the bearing sleeve, a radial bearing part provided between the inner peripheral surface of the bearing sleeve and an outer peripheral surface of the shaft member for supporting the shaft member in a radial direction in a non-contact manner by a lubricating oil film formed in a bearing gap, a thrust bearing part provided on the bottom part of the housing for supporting one end surface of the shaft member in a thrust direction, and a bottom member provided on the bottom part of the housing for covering an inner peripheral portion at one end of the bearing sleeve, wherein the housing is molded by a resin with the bearing sleeve and the bottom member as insert pieces.

When molding the housing, the gap formed between the portion at the inner periphery at one end of the bearing sleeve and the inner mold that is fitted with the inner peripheral surface of the bearing sleeve is blocked by the bottom member, so that molten resin does not fill this gap. Because the portion at the inner periphery at one end of the bearing sleeve makes no contact with resin, the problem of resin separation therefrom does not occur.

In the above constructions, the bearing part may be configured as a dynamic pressure bearing that generates dynamic pressure of lubricating oil in a bearing gap. Further, it is preferable to form a sealing portion at the other end of the housing for forming a sealing gap between itself and an outer peripheral surface of the shaft member, so as to prevent lubricating oil leakage to the outside of the housing.

DETAILED DESCRIPTION OF THE INVENTION

Preferred embodiments of the present invention will be hereinafter described with reference to the accompanying drawings.

Figure 1:
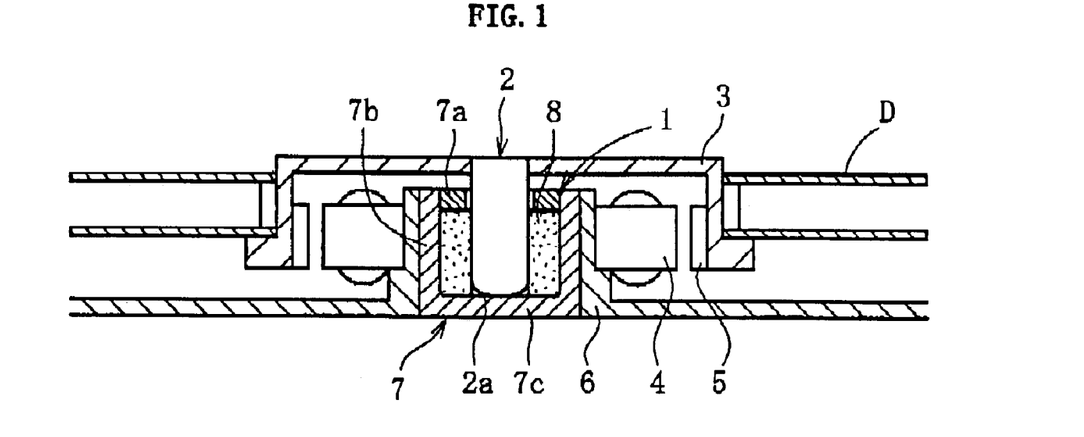
FIG. 1 is a cross-sectional view of a spindle motor for information equipment in which a fluid bearing device is used.

FIG. 1 shows one embodiment of a spindle motor structure incorporating a fluid bearing device 1 according to the invention. The spindle motor is for various disk drive devices (HDDs etc.), and includes the fluid bearing device 1 for rotatably supporting a shaft member 2 in a non-contact manner, a disk hub 3 attached to the shaft member 2, a stator 4, and a rotor 5 radially opposite the stator 4 with a gap therebetween. The stator 4 is mounted on the outer periphery of a casing 6, while the rotor 5 is mounted to the inner periphery of the disk hub 3. The housing 7 of the fluid bearing device 1 is attached to the inner periphery of the casing 6. The disk hub 3 is for holding one or a plurality of disks D such as magnetic disks and the like. Energizing the stator 4 rotates the rotor 5 by an excitation force therebetween, thereby rotating the disk hub 3 and the shaft member 2 together. The fluid bearing device 1 is one of various embodiments described below.

Figure 2:
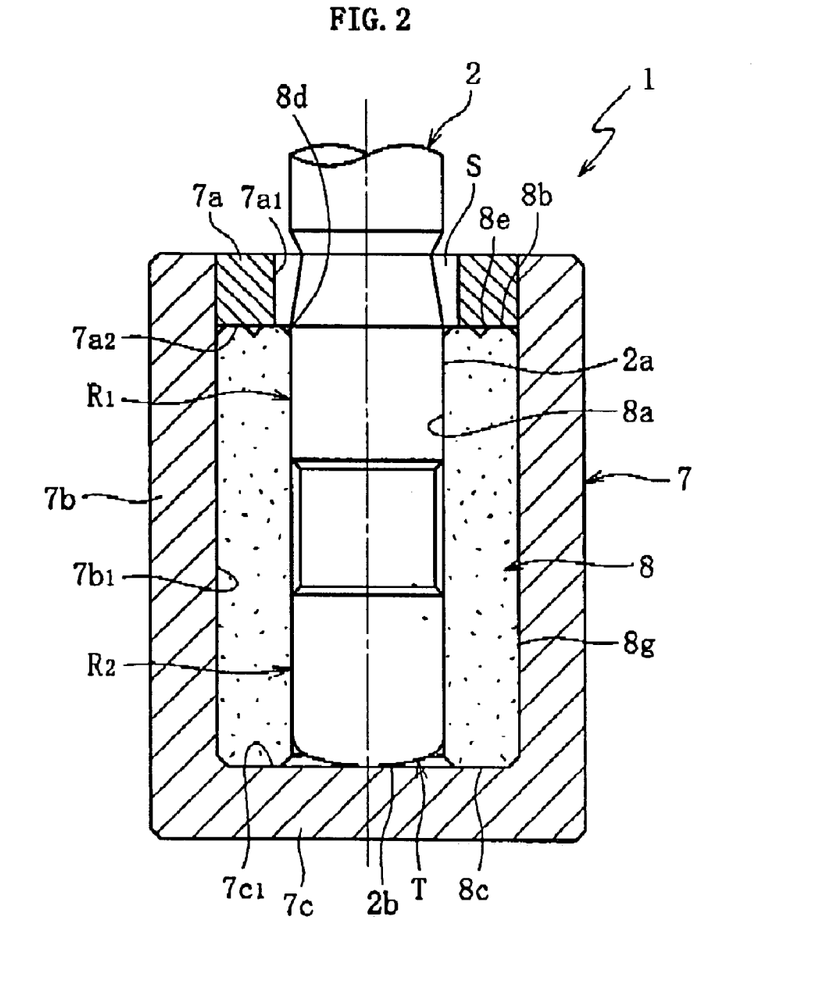
FIG. 2 is a cross-sectional view showing a first embodiment of the invention.

FIG. 2 shows a first embodiment of the fluid bearing device 1, which is a fluid dynamic bearing that supports the shaft member by dynamic pressure of lubricating oil formed in a bearing gap by dynamic-pressure generating grooves.

The fluid dynamic bearing 1 generally includes a bottomed cylindrical housing 7 having one open end, a cylindrical bearing sleeve 8, and the shaft member 2.

Between the inner peripheral surface 8a of the bearing sleeve 8 and the outer peripheral surface 2a of the shaft member 2 are first and second radial bearing parts R1, R2 spaced apart from each other in an axial direction. Between the lower end surface 2b of the shaft member 2 and the inner bottom surface 7c1 of the bottom part 7c of the housing 7 is a thrust bearing part T. For ease of explanation, the side of the thrust bearing part T is taken as a lower side, and the opposite side as an upper side.

The shaft member 2 is made, for example, of a metal material such as stainless steel. Its lower end surface 2b is domed so that the contact between itself and the inner bottom surface 7c1 of the bottom part 7c of the housing 7 forms the pivot type thrust bearing part T. While the lower end surface 2b is directly contacted to the inner bottom surface 7c1 of the housing 7 in the illustrated example, it may be contacted on a thrust plate made of a suitable, e.g., low-friction material and the like placed on the bottom part 7c of the housing 7.

The bearing sleeve 8 is arranged in a predetermined position on the inner peripheral surface 7b1 of a body part 7b of the housing 7. The bearing sleeve 8 is made of a porous sintered metal material chiefly comprising copper, for example. The internal pores of the sintered metal porous structure of the bearing sleeve 8 are impregnated with lubricating fluid such as lubricating oil.

On the inner peripheral surface 8a of the bearing sleeve 8 are provided two regions axially spaced from each other forming bearing surfaces of the two, first and second radial bearing parts R1, R2, where dynamic-pressure generating grooves such as herringbone grooves are formed. The grooves may take other forms such as spiral or axial. An annular groove 8e is provided on the upper end surface 8b of the bearing sleeve 8 for orientation recognition thereof.

The housing 7 is made of a resin composition and formed by injection molding together with the sintered metal bearing sleeve 8 as an insert piece. The housing 7 includes the cylindrical body part 7b, a sealing portion 7a extending from the top of the body part 7b radially inwards, and the bottom part 7c closing the lower end of the body part 7b. The housing 7 of this illustrated example has the body part 7b and bottom part 7c as one-piece, to which the sealing portion 7a is welded. More specifically, the body part 7b and bottom part 7c are integrally molded with the bearing sleeve 8 as an insert piece, after which a separately prepared sealing portion 7a is attached to the inner periphery at the top of the body part 7b, and welded thereto by some plastic welding means such as an ultrasonic welding.

The inner peripheral surface 7a1 of the sealing portion 7a and the inner peripheral surface 7b1 of the body part 7b both extend straight in the axial direction. The inner peripheral surface 7a1 of the sealing portion 7a forms a tapered sealing gap S of a predetermined width with the opposing tapered outer peripheral surface of the shaft member 2. Inside the housing 7, an inner surface 7a2 of the sealing portion 7a and the upper end surface 8b of the bearing sleeve 8 are in tight contact with each other, and so are the inner peripheral surface 7b1 of the body part 7b and the outer peripheral surface 8g of the bearing sleeve 8, and the inner bottom surface 7c1 of the bottom part 7c and the lower end surface 8c of the bearing sleeve 8.

The bearing sleeve 8 is formed, at the inner periphery of its upper end surface 8b, with a chamfered portion 8d, which is not covered by resin. The aforementioned annular groove 8e may be formed in this chamfered portion 8d, so that it is recognizable from outside for determining orientation of the bearing sleeve 8 even after the molding of the housing 7. The recognition will still be possible even in the case in which the groove 8e is formed on the upper end surface 8b if the resin material forming the housing 7 is transparent at least in the sealing portion 7a.

The shaft member 2 is inserted into the space formed by the inner peripheral surface 8a of the bearing sleeve 8, its lower end surface 2b making contact with the inner bottom surface 7c1 of the bottom part 7c of the housing. The inner space of the housing 7 that is sealed by the sealing portion 7a is filled with lubricating oil, including the internal pores of the bearing sleeve 8. The oil surface of the lubricating oil is maintained within the sealing gap S.

When the shaft member 2 and the bearing sleeve 8 relatively rotate, upper and lower, regions on the inner peripheral surface 8a of the bearing sleeve 8 forming the radial bearing surfaces oppose the outer peripheral surface 2a of the shaft member 2, respectively, with a bearing gap therebetween. In this embodiment, the shaft member 2 is rotated. As it rotates, a lubricating oil film is formed in the radial bearing gap, and its dynamic pressure supports the shaft member 2 rotatably in a radial direction in a non-contact manner. The first and second radial bearing parts R1, R2 are thus constructed for providing the non-contact support of the shaft member 2 in the radial direction. The shaft member 2 is also supported rotatably in a thrust direction by the pivot type thrust bearing part T.

As described above, the body part 7b and bottom part 7c of the housing are preformed as one-piece in a cup-like shape, to which the separately prepared sealing portion 7a is welded to form the housing 7. The shape of each component is thereby made simple, so that these parts 7a to 7c of the housing 7 are formed with high precision. Thus a higher degree of precision is achieved for the housing 7. Meanwhile, the separate sealing portion 7a can be formed of a resin composition of suitable choice of characteristics in accordance with the required sealing performance. The sealing properties are thereby enhanced, and oil leakage from the housing 7 or penetration of foreign matter such as water can reliably be prevented for a longer period of time.

The resin composition having non-adhesive properties have good sealing properties. For example, resin compositions having a water contact angle of 80° or more are not only water-repellent but also oil-repellent and thus capable of preventing oil leakage or water penetration from outside for a long time. Melt processible fluoropolymer rein such as PFA and polyolefin resin such as PE are good examples of such resin compositions. Alternatively, one or more of PTFE, fluoropolymer resin as the above, and polyolefin resin may be mixed with thermoplastic base resin (engineering plastic in particular) to obtain a resin composition having non-adhesive properties and similar characteristics. The base resin may be any of polyamide resin, polyphenylene sulfide (PPS) resin, liquid crystal polymer (LCP) resin, and the like.

Figure 3:
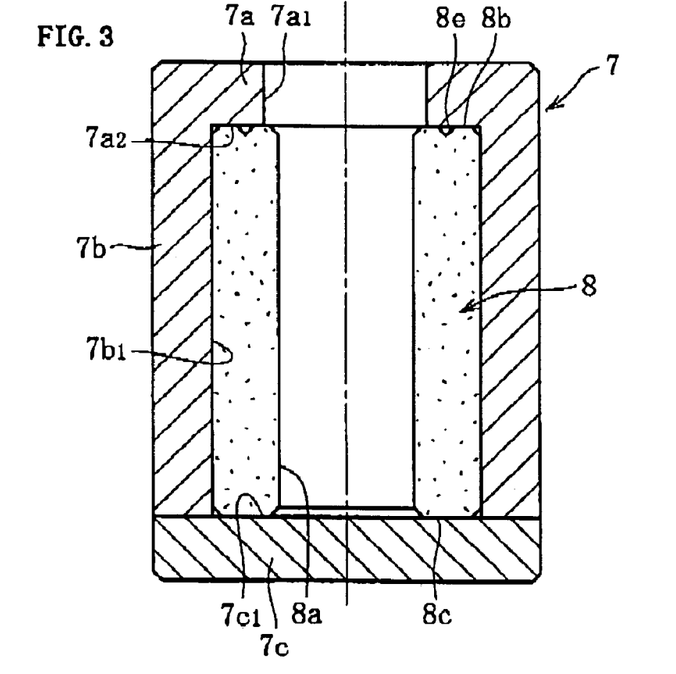
FIG. 3 is a cross-sectional view showing a second embodiment of the invention.

FIG. 3 shows a second embodiment, in which, unlike the first embodiment, the sealing portion 7a and body part 7b are pre-formed as one-piece in a cup-like shape. The bottom part 7c of the housing 7 is prepared as a separate piece and welded to the lower end surface of the body part 7b by means of ultrasonic welding or the like after the insert molding.

In this case, the bottom part 7c can be formed of a resin composition having excellent wear resistance and self-lubricating properties, whereby friction in the thrust bearing part T is diminished, wear of the bottom part 7c is reduced, and torque is lessened. Such a resin composition may be obtained, for example, by mixing solid lubricant such as PTFE, graphite, molybdenum disulfide with thermoplastic resin (engineering plastic in particular) such as PPS or LCP resin.

Figure 4:
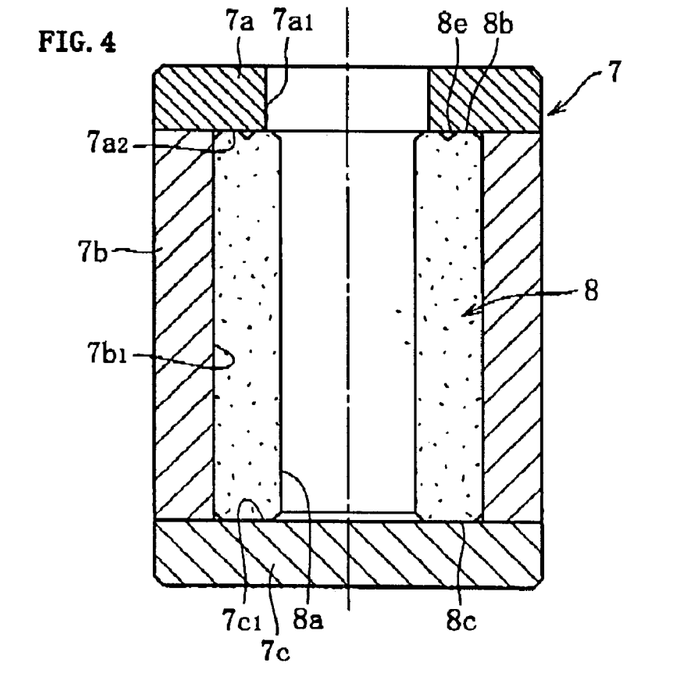
FIG. 4 is a cross-sectional view showing a third embodiment of the invention.

FIG. 4 shows a third embodiment, in which all of the sealing portion 7a, body part 7b, and bottom part 7c of the housing 7 are formed as separate components and welded together. That is, after insert molding the bearing sleeve 8 in the body part 7b, the separate sealing portion 7a and bottom part 7c are welded to the upper and lower end surfaces of the body part 7b, respectively, by means of ultrasonic welding or the like.

In this case, the body part 7b can be formed of a resin composition having high dimension precision, whereby the housing 7, and in particular its body part 7b, is made to a higher degree of precision so that deformation of the bearing sleeve 8 resulting from dimensional errors of the housing 7 is prevented and precision of the dynamic-pressure generating grooves is maintained. Such a resin composition may be obtained, for example, by mixing fiber reinforcing material such as glass fiber, whisker reinforcing material such as potassium titanate, flake reinforcing material such as mica, and other suitable reinforcing additives with thermoplastic resin (engineering plastic in particular) such as PPS or LCP resin.

Figure 5:
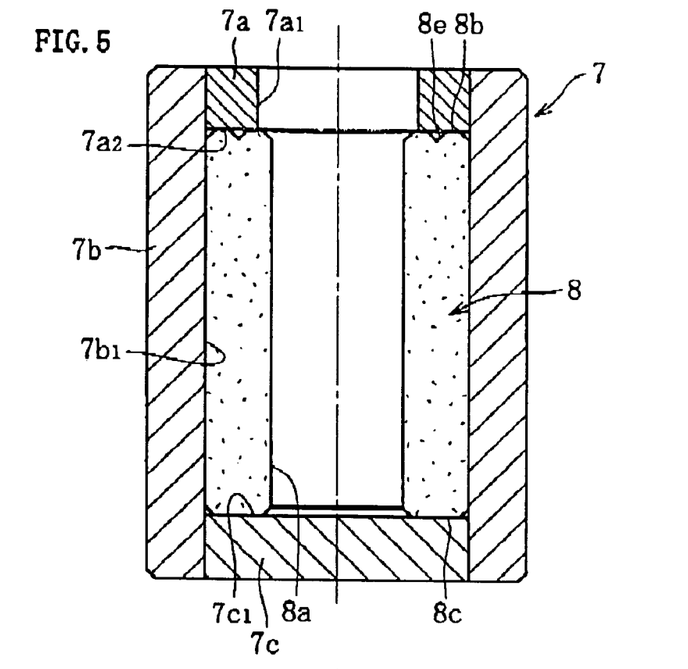
FIG. 5 is a cross-sectional view showing a fourth embodiment of the invention.

FIG. 5 shows a fourth embodiment, in which, a separate sealing portion 7a and bottom part 7c are welded to the body part 7b similarly to the third embodiment. However, unlike the previous embodiment in which these are welded to the upper and lower end surfaces of the body part 7b, they are welded to an inner peripheral surface at the top and bottom of the body part 7b. Other features are the same as those of the third embodiment and will not be described again.

Figure 6:
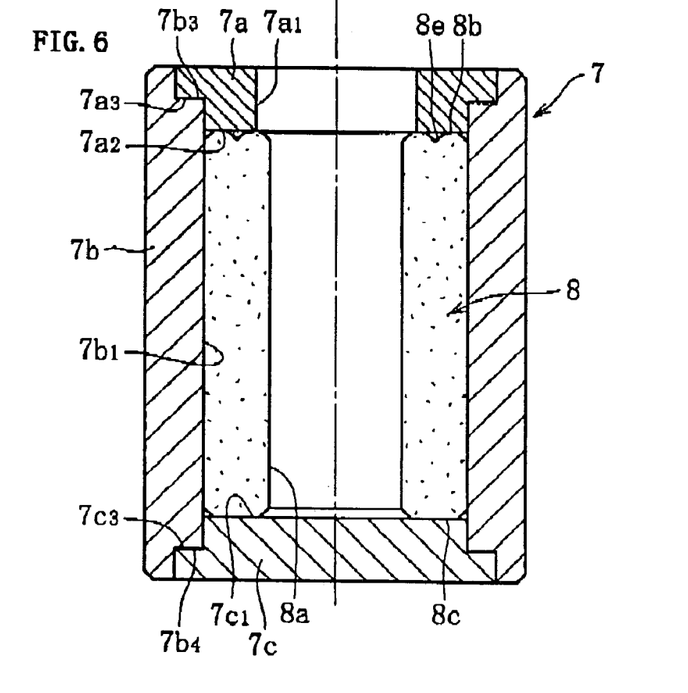
FIG. 6 is a cross-sectional view showing a fifth embodiment of the invention.

FIG. 6 shows a fifth embodiment, which is a combination of the third and fourth embodiments; a separate sealing portion 7a is formed with a step 7a3, and the bottom part 7c likewise has a step 7c3. Also, the body part 7b is formed with steps 7b3, 7b4 at its top and bottom. The step 7a3 of the sealing portion 7a is brought into tight contact with the step 7b3 at the upper end of the body part 7b, and the step 7c3 of the bottom part 7c with the step 7b4 at the lower end, and welded together. One of the sealing portion 7a and bottom part 7c may be welded to the body part in the same manner as in the third or fourth embodiment.

When constructing the housing 7 by welding together separate pieces of components 7a to 7c, it is preferable to use resin compositions including the common base resin for molding the components to be welded to each other, whereby reliable welds are formed and welding operability is improved. That is, if the body part 7b is made of a resin composition including LCP as the base resin, then the sealing portion 7a and bottom part 7c should preferably be formed of a resin composition including LCP as the base resin.

LCP is known as a self-reinforcing liquid crystal polymer and it also exhibits friction-reducing properties after setting. Thus it possesses excellent wear resistance and high precision properties as its own characteristics without additives such as reinforcing material or solid lubricant. Therefore, LCP may be used alone for all the components 7a to 7c of the housing 7, enabling the housing 7 to be formed entirely of one resin composition. Since LCP also has low outgas properties, it is particularly suitable for the housing 7 of a spindle motor bearing in an HDD device in which outgassing must be eliminated.

Figure 7:
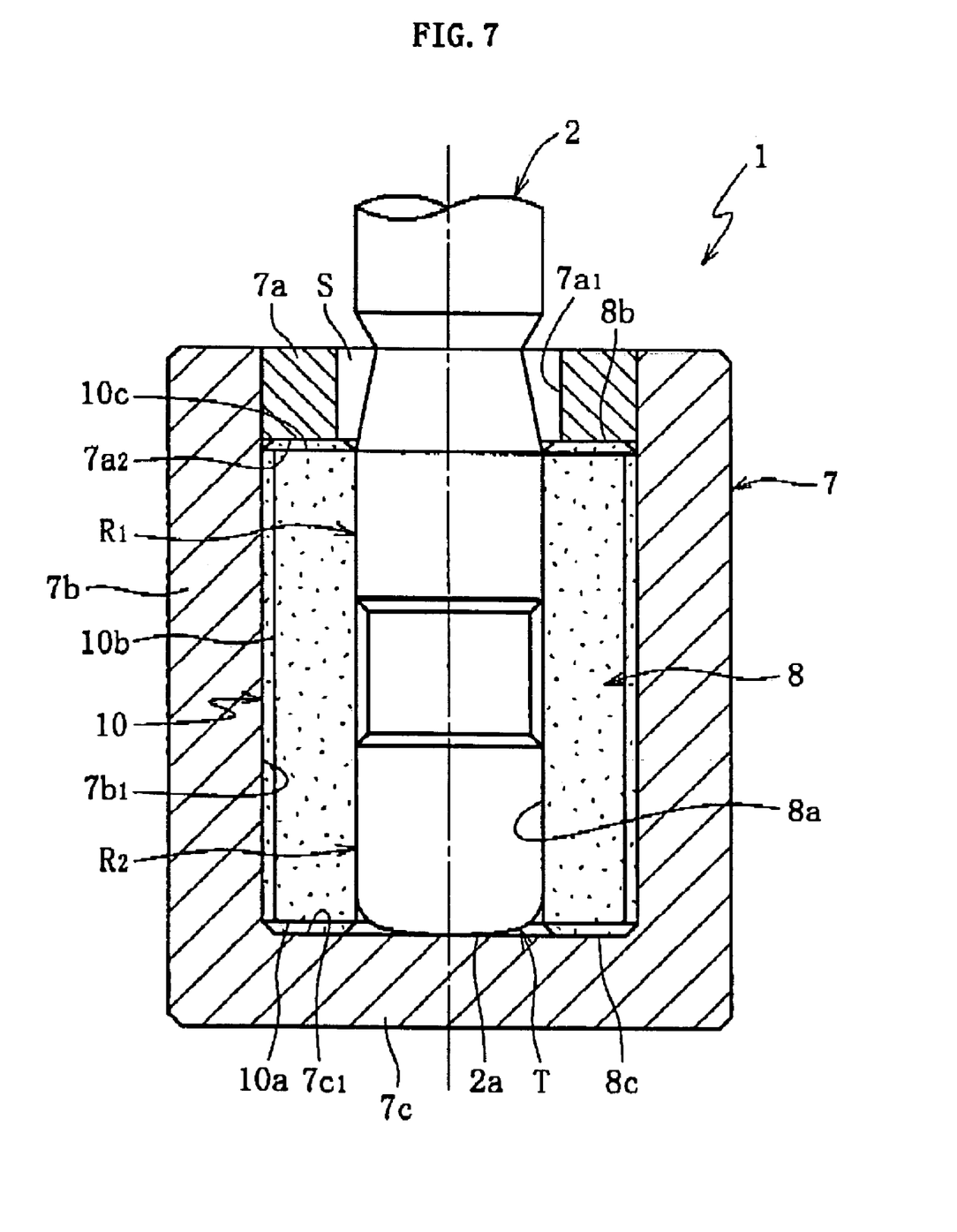
FIG. 7 is a cross-sectional view showing a sixth embodiment of the invention.

FIG. 7 shows a sixth embodiment, in which the thrust bearing part T is communicated to the sealing gap S in the sealing portion 7a by a connecting groove 10. In this embodiment, the connecting groove 10 is made up of a first radial groove 10a formed in the lower end surface 8c of the bearing sleeve 8, an axial groove 10b in the outer peripheral surface of the bearing sleeve 8, and a second radial groove 10c in the upper end surface 8b of the bearing sleeve 8. Alternatively, the first radial groove 10a may be formed in the inner bottom surface 7c1 of the bottom part 7c of the housing 7, the axial groove 10b in the inner peripheral surface 7b1 of the housing 7, and the second radial groove 10c in the inner surface 7a2 of the sealing portion 7a.

The housing 7 is formed of a resin composition similarly to the first embodiment shown in FIG. 2. Unlike the previous embodiment, however, the bearing sleeve 8 is not insert-molded in the one-piece body part 7b and bottom part 7c but fixed therein by suitable means such as bonding, press-fitting, ultrasonic welding and the like. The sealing portion 7a is separately prepared and welded to the inner periphery at the top of the body part 7b by welding means such as an ultrasonic welding. The bearing sleeve 8 is not insert-molded in the housing 7 in this embodiment because of the first radial groove 10a and axial groove 10b formed in the bearing sleeve 8, which must not be covered by molten resin.

A pressure rise in the lubricating oil around the thrust bearing part T during rotation of the shaft member 2 generates a flow of lubricating oil towards the sealing gap S through the connecting groove 10, whereby lubricating oil pressures around the thrust bearing part T and sealing gap S are maintained equal. Generation of air bubbles resulting from a local negative pressure in lubricating oil, and consequent lubricant leakage or vibration are thereby prevented. Also, axial displacement (floating) of the shaft member 2 caused by a pressure rise in lubricating oil around the thrust bearing part T is prevented.

Figure 8:
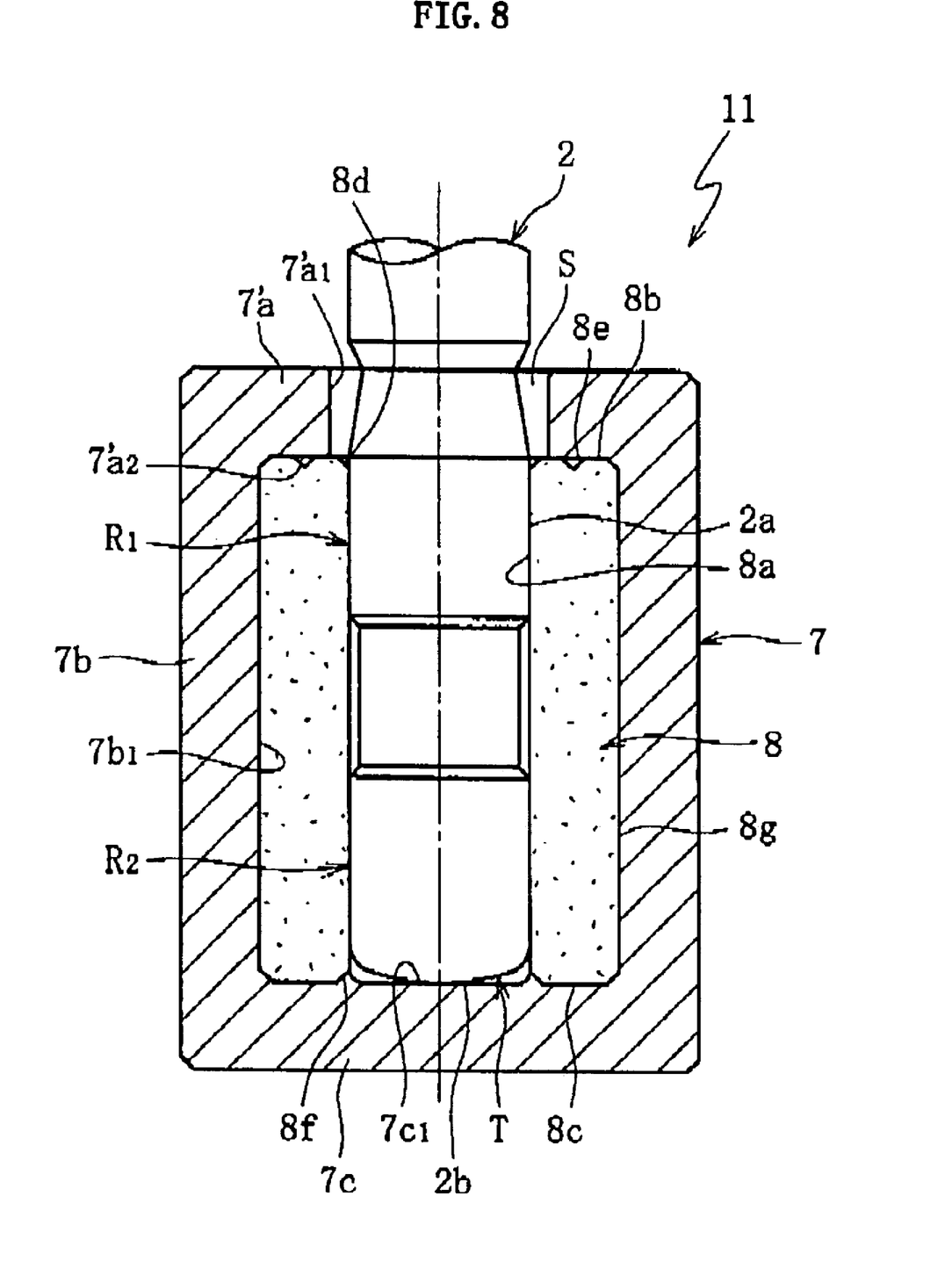
FIG. 8 is a cross-sectional view showing a seventh embodiment of the invention.

FIG. 8 shows a fluid bearing device 11 according to a seventh embodiment of the invention, including a housing 7, a bearing sleeve 8, and a shaft member 2.

Between the inner peripheral surface 8a of the bearing sleeve 8 and the outer peripheral surface 2a of the shaft member 2 are first and second radial bearing parts R1, R2 spaced apart from each other in the axial direction. Between the lower end surface 2b of the shaft member 2 and the inner bottom surface 7c1 of the bottom part 7c of the housing 7 is a thrust bearing part T. For ease of explanation, the side of the thrust bearing part T is taken as a lower side, and the opposite side as an upper side.

The shaft member 2 is made, for example, of a metal material such as stainless steel. Its lower end surface 2b is formed in a dome shape.

The cylindrical bearing sleeve 8 is made of a porous sintered metal material chiefly comprising copper, for example. On the inner peripheral surface 8a of the bearing sleeve 8 are provided two, upper and lower, regions axially spaced from each other forming bearing surfaces of the first and second radial bearing parts R1, R2, where dynamic-pressure generating grooves such as herringbone grooves are formed. The grooves may take other forms such as spiral or axial. A marking 8e, e.g., circular groove as in the illustrated example, is provided on the upper end surface 8b of the bearing sleeve 8 for indicating the top side thereof. Furthermore, the inner peripheral edges at the top and bottom of the bearing sleeve 8 are formed as chamfered portions 8d, 8f.

In this embodiment, the inner peripheral surface 8a of the bearing sleeve 8 has a surface porosity rate ranging from 0.5 to 10%, preferably 1 to 5%, while the chamfered portion 8f at the bottom has a larger surface porosity rate than that of the inner peripheral surface 8a, e.g., 3% or more, preferably 5 to 30%. Preferably, at least one of the upper end surface 8b, lower end surface 8c, and outer peripheral surface 8g should have a surface porosity rate similar to that of the chamfered portion 8f, in this embodiment, all of these have the same surface porosity rate as that of the chamfered portion 8f. The other chamfered portion 8d at the top may have the same surface porosity rate as that of the inner peripheral surface 8a, or of the chamfered portion 8f.

The housing 7 is formed by resin injection molding together with the sintered metal bearing sleeve 8 as an insert piece. The housing 7 includes the cylindrical body part 7b, a sealing portion 7'a extending from the top of the body part 7b radially inwards, and the bottom part 7c continuous with the lower end of the body part 7b. The inner peripheral surface 7'a1 of the sealing portion 7'a forms a sealing gap S of a predetermined width with the opposing outer peripheral surface 2a of the shaft member 2. In this embodiment, the outer peripheral surface 2a of the shaft member 2 facing the inner peripheral surface 7'a1 of the sealing portion 7'a to form the sealing gap S has an upwardly diminishing taper (diminishing towards outside of the housing 7), so that it functions also as a centrifugal seal during rotation of the shaft member 2.

Figure 9:
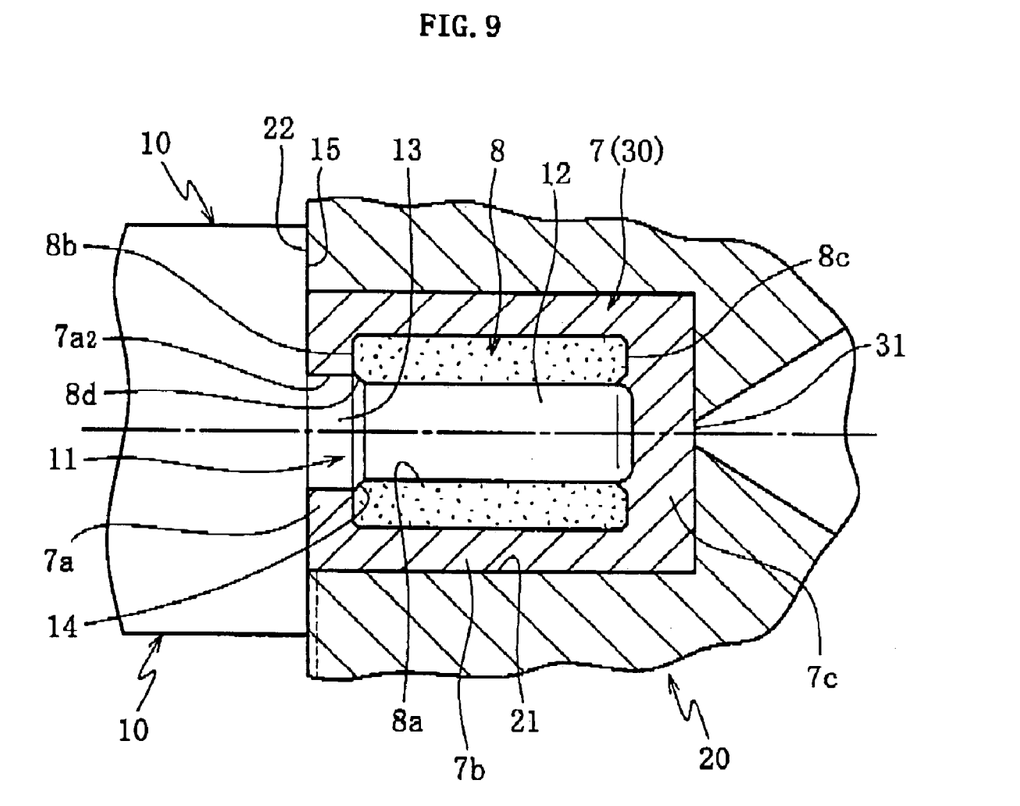
FIG. 9 is a conceptual cross-sectional view of an injection molding apparatus for molding a housing.

FIG. 9 provides a conceptual presentation of an injection molding apparatus for forming the housing 7. The apparatus has an inner mold 10 and an outer mold 20, one of which, e.g., inner mold 10, is movable, while the other one, e.g., outer mold 20, is stationary.

The inner mold 10 includes a shaft 11 having a circular cross section. The shaft 11 has an engaging part 12 to which is fitted the inner peripheral surface 8a of the bearing sleeve 8, and a seal forming part 13 for forming the inner peripheral surface 7'a1 of the sealing portion 7'a of the housing 7; the latter has a larger outside diameter than the former. At the interface between the engaging part 12 and seal forming part 13 is formed a tapered abutting part 14, which will abut on the chamfered portion 8d at the inner periphery at the top of the bearing sleeve 8 for the positioning thereof inside the cavity 30.

The outer mold 20 has a hollow cylindrical molding part 21. When the molds are closed in coaxial relationship, their abutting faces 22, 15 contact each other and the cavity 30 is formed around the bearing sleeve 8. Molten resin is injected from a gate 31 to fill this cavity 30, and after the resin is cured, the inner and outer molds 10, 20 are opened. The resin-molded housing 7 with the embedded bearing sleeve 8 is thus obtained.

The housing 7 and bearing sleeve 8 are fixed with each other by this insert molding and no other step is necessary. Inside the housing 7, as can be seen from FIG. 8, the inner surface 7'a2 of the sealing portion 7'a and the upper end surface 8b of the bearing sleeve 8 are in tight contact with each other, and so are the inner peripheral surface 7b1 of the body part 7b and the outer peripheral surface 8g of the bearing sleeve 8, and the inner bottom surface 7c1 of the bottom part 7c and the lower end surface 8c and chamfered portion 8f of the bearing sleeve 8. The inner peripheral surface 8a and chamfered portion 8d at the top of the bearing sleeve 8 are not covered by the resin.

Since the bearing sleeve 8 is formed of a porous sintered metal material with the aforementioned surface porosity rate setting with respect to its chamfered portion 8f at the bottom, upper end surface 8b, lower end surface 8c, and outer peripheral surface 8g, it remains firmly and stably in tight contact with the housing 7 by the anchoring effect. Because of the secure contact with the resin particularly in the chamfered portion 8f where peeling of resin can easily occur, the reliability of the fluid bearing device is much improved.

When injection molding, the bearing sleeve 8 should preferably be preheated to a higher temperature of, e.g., 150° C. or more, than the mold temperature of approximately 100° C., and more preferably to a higher temperature than the melting point of the resin. Preheating of the bearing sleeve 8 before the injection molding allows easier penetration of the molten resin from the surface pores on the surface into the internal pores in the surface layer of the bearing sleeve 8, whereby the above-mentioned anchoring effect is further enhanced.

To assemble the fluid bearing device 11 of this embodiment, the shaft member 2 is installed into this one-piece component of the housing 7 and bearing sleeve 8 obtained by the above insert molding. The shaft member 2 is inserted into the space formed by the inner peripheral surface 8$a$ of the bearing sleeve 8, and its lower end surface 2$b$ is contacted on the inner bottom surface 7$c$1 of the housing 7. The inner space of the housing sealed by the sealing portion 7'$a$ is then filled with lubricating oil.

When the shaft member 2 is rotated, the two, upper and lower, regions on the inner peripheral surface 8$a$ of the bearing sleeve 8 forming the radial bearing surfaces oppose the outer peripheral surface 2$a$ of the shaft member 2, with a bearing gap therebetween. The rotation of the shaft member 2 generates dynamic pressure of lubricating oil in the radial bearing gap, and a lubricating oil film formed therein supports the shaft member 2 rotatably in the radial direction in a non-contact manner. The first and second radial bearing parts R1, R2 are thus constructed for providing the non-contact support of the shaft member 2 in the radial direction. At the same time, the lower end surface 2$b$ of the shaft member 2 is supported by the inner bottom surface 7$c$1 of the housing 1. Thus the thrust bearing part T for rotatably supporting the shaft member 2 in the thrust direction is constructed.

Figure 10:
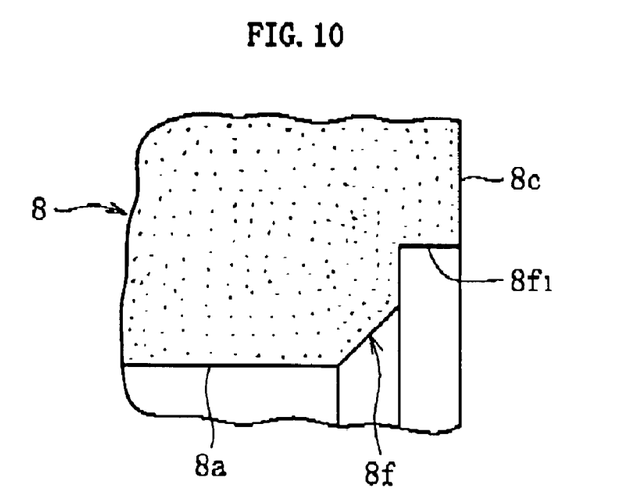
FIG. 10 is a cross-sectional view showing the vicinity of a chamfered portion of a bearing sleeve according to an eighth embodiment of the invention.
Figure 11:
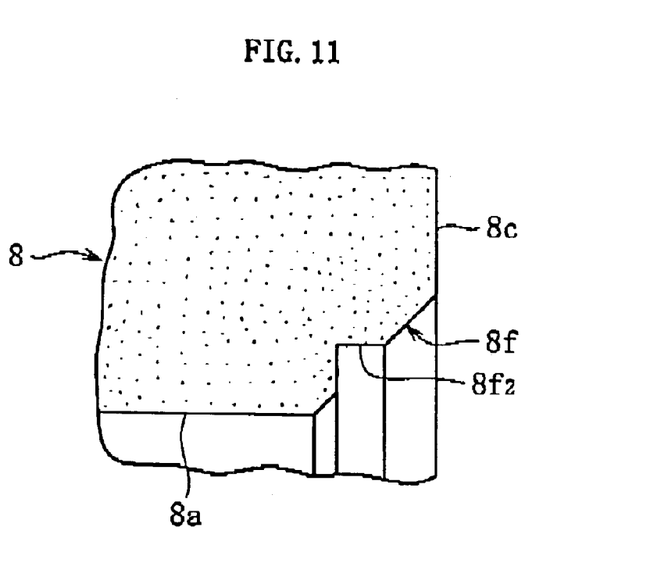
FIG. 11 is a cross-sectional view showing the vicinity of a chamfered portion of a bearing sleeve according to a ninth embodiment of the invention.
Figure 12A:
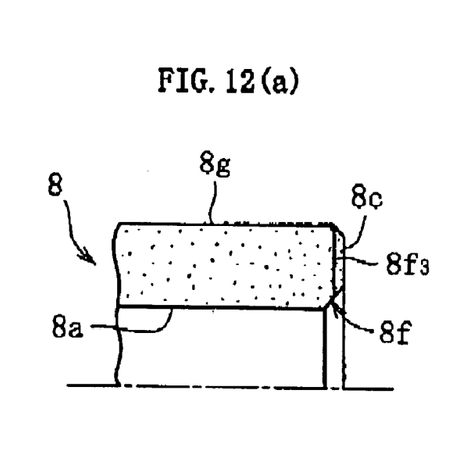
FIG. 12 is a cross-sectional view showing the vicinity of a chamfered portion of a bearing sleeve according to a tenth embodiment of the invention.
Figure 12B:
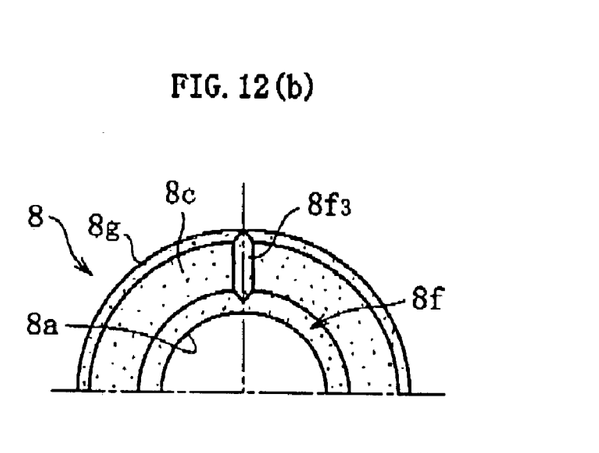

FIG. 10 to FIG. 12 show further embodiments in which the chamfered portion 8$f$ of the bearing sleeve 8 is formed with a recess so as to enhance the resin separation preventing effect. In the eighth embodiment shown in FIG. 10, the recess is formed as a circular groove 8$f$1 located between the chamfered portion 8$f$ and the lower end surface 8$c$. In the ninth embodiment shown in FIG. 11, the recess is formed as a circular groove 8$f$2 in the middle of the chamfered portion 8$f$. In the tenth embodiment shown in FIG. 12($a$) and FIG. 12($b$), the recess is formed as a radial groove 8$f$3 across the lower end surface 8$c$ into the chamfered portion 8$f$. The radial groove 8$f$3 may be a single groove or a plurality of grooves at different circumferential locations.

Figure 13:
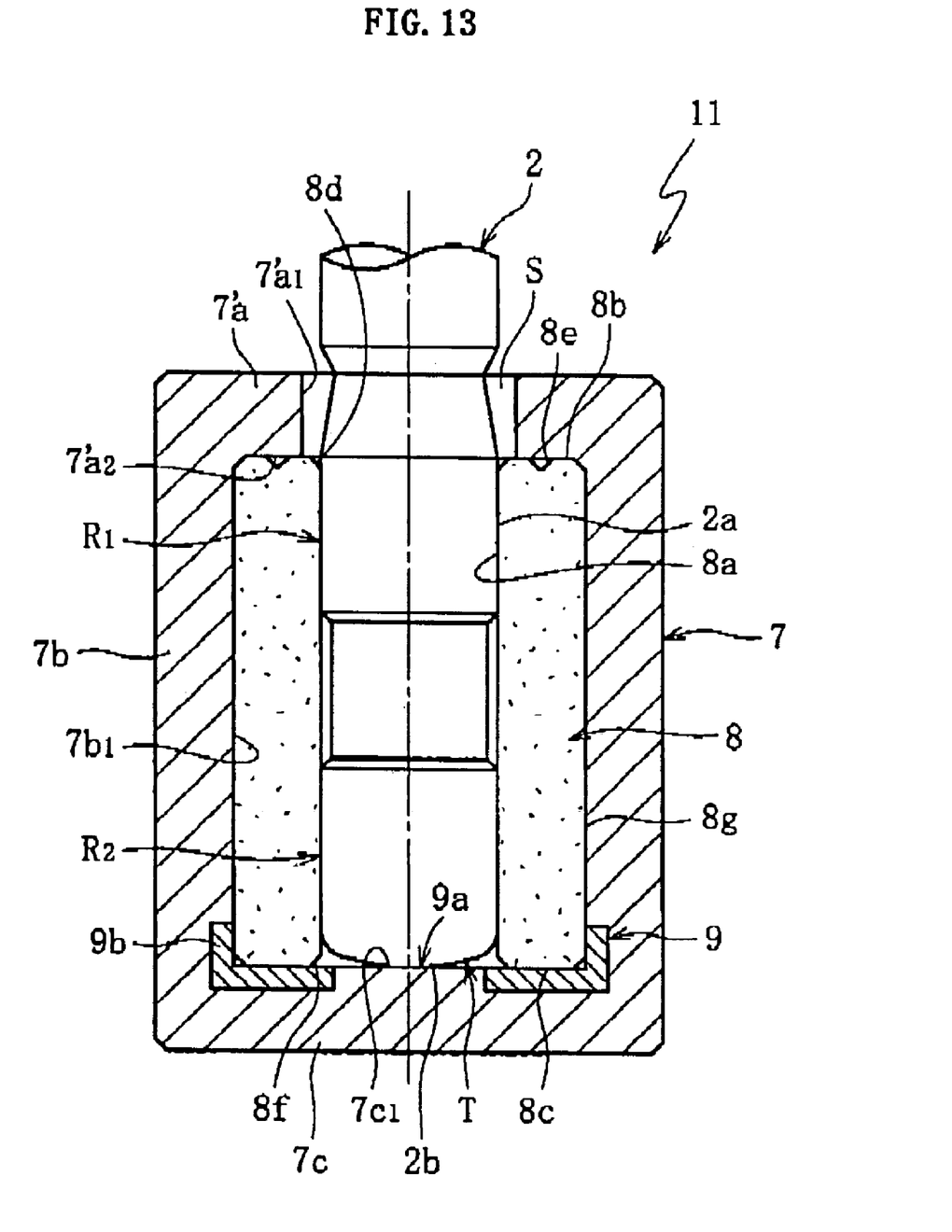
FIG. 13 is a cross-sectional view showing an eleventh embodiment of the invention.

FIG. 13 shows an eleventh embodiment in which a bottom member 9 made of metal or the like is embedded in the bottom part 7$c$ of the housing 7. The bottom member 9 includes a through hole 9$a$ at its center and a flange 9$b$ extending upward from the outer periphery. The upper surface is in contact with the lower end surface 8$c$ of the bearing sleeve 8, and the inner surface of the flange 9$b$ with the outer peripheral surface 8$g$ of the bearing sleeve 8. The through hole 9$a$ is filled with the resin that constitutes the housing 7, and the lower end surface 2$b$ of the shaft member 2 is in contact with an inner bottom surface 7$c$1 that is formed by the filled resin, and not with the bottom member 9. The inner periphery of the bottom member 9 extends slightly further inwards than the inner peripheral surface 8$a$ of the bearing sleeve 8, so that the chamfered portion 8$f$ is covered by the bottom member 9 from below.

The housing 7 of this embodiment can be obtained by resin molding using such an injection molding apparatus as shown in FIG. 9, with the bearing sleeve 8 and bottom member 9 as insert pieces. When molding the housing 7, the gap formed between the chamfered portion 8$f$ of the bearing sleeve 8 and inner mold 10 is blocked by the bottom member 9, so that molten resin does not fill this gap. Because the chamfered portion 8$f$ of the bearing sleeve 8 makes no contact with resin, the problem of resin separation from the chamfered portion 8$f$ does not occur.

Figure 14:
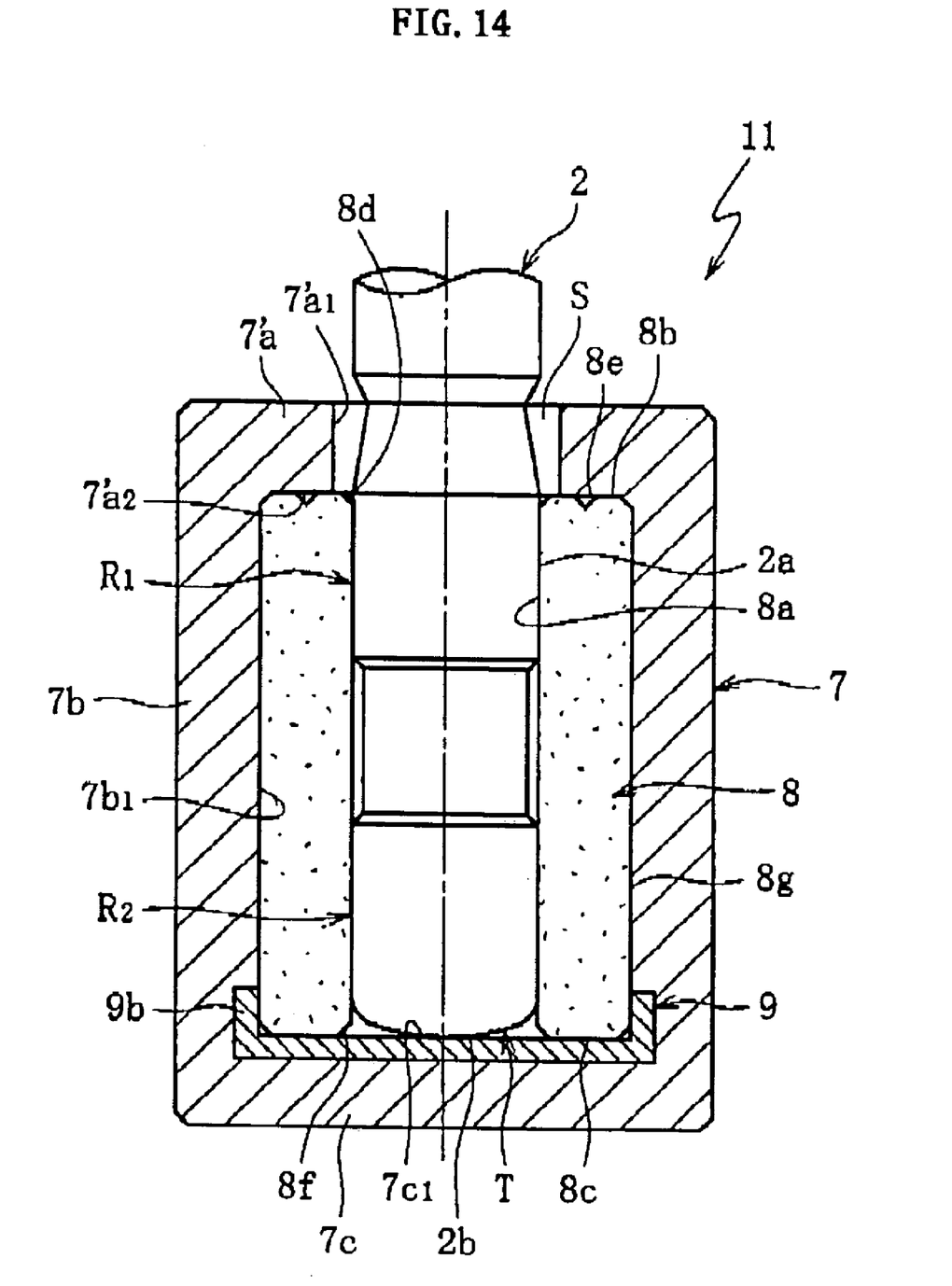
FIG. 14 is a cross-sectional view showing a twelfth embodiment of the invention.

FIG. 14 shows a twelfth embodiment, in which the bottom member 9 has no through hole at its center.

While the bearing sleeve 8 in the above embodiments is made of sintered metal, it may be made of other metal materials such as stainless steel, copper alloy, brass, and the like. In this case, the bearing sleeve 8 is given certain surface roughness for the purpose of preventing resin separation, instead of differing the porosity rate in the porous metal material as with the above embodiments. Specifically, a chamfered portion at the inner periphery at the bottom of the bearing sleeve, which has been denoted at 8$f$ in the previous embodiments, is made to have a larger surface roughness than that of the inner peripheral surface of the bearing sleeve. For example, if the inner peripheral surface of the bearing sleeve has a surface roughness of less than Ra 0.5, then the chamfered portion at the inner periphery at the bottom is made to have a surface roughness of Ra 0.5 or more. Preferably, at least one of the upper end face, lower end face, and outer peripheral surface of the bearing sleeve should have the same surface roughness as that of the chamfered portion.

Figure 15:
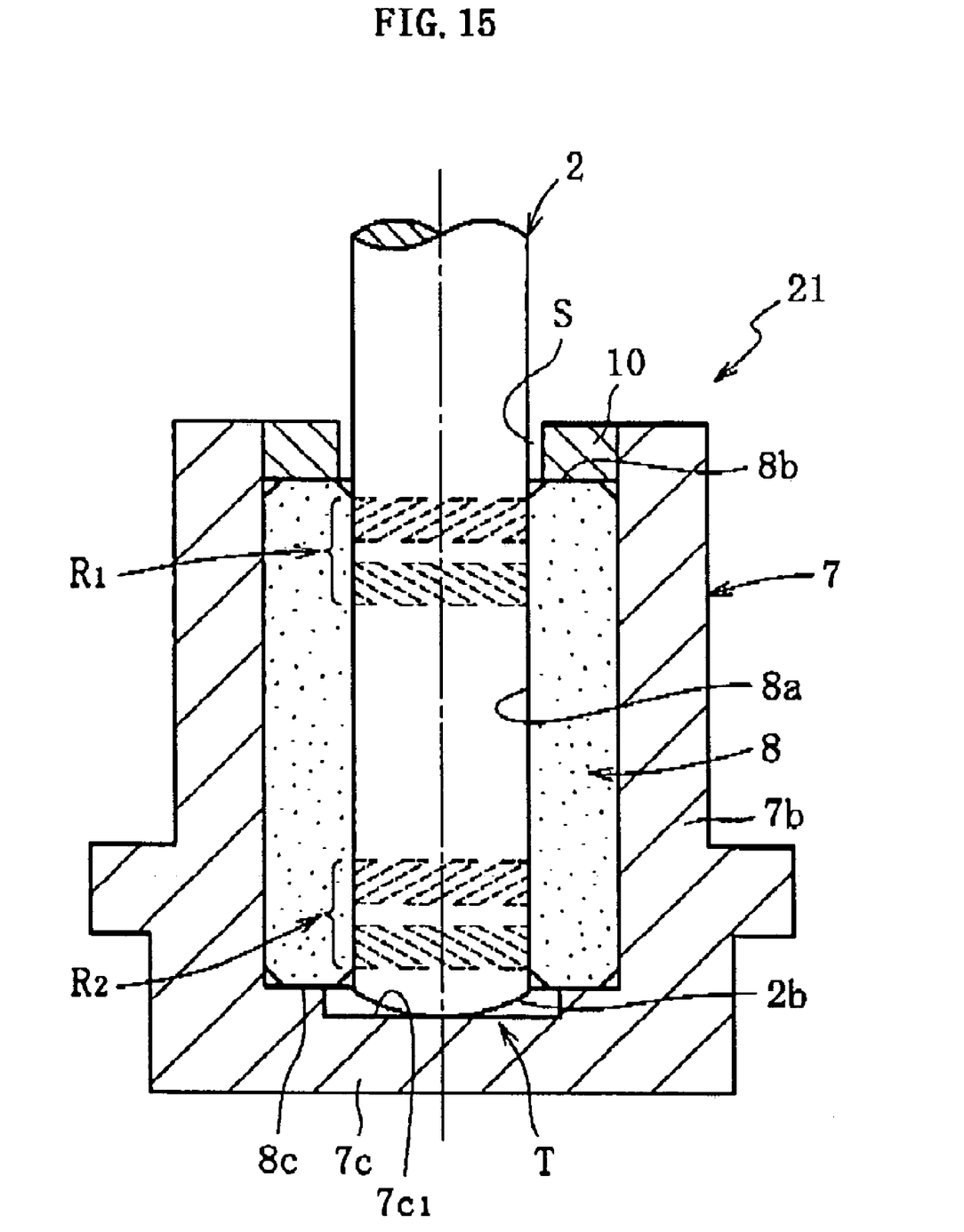
FIG. 15 is a cross-sectional view showing a thirteenth embodiment of the invention.

FIG. 15 shows a fluid bearing device 21 according to a thirteenth embodiment. The bearing sleeve 8 in this embodiment is not embedded in the resin-molded housing 7, but fixed to the inner periphery of the pre-formed, bottomed tubular housing 7 by means of bonding, press-fitting, and the like.

The sealing portion is formed by a separate sealing member 10; it may either be made of a resin composition as in the previous embodiments, or of a metal material.

Through vigorous research, the present inventors have ascertained what characteristics are required of the housing 7 and what the ideal conditions are for allowing the housing to exhibit such characteristics.

[Low Oil Absorption Rate]

The resin composition constituting the housing 7 is required to have a low oil absorption rate, since the housing 7 makes contact with the lubricating fluid which is oil in a large area. High oil absorption rate will lead to lubricating oil insufficiency inside the housing, whereby it will become difficult to generate sufficient dynamic pressure in the bearing gap.

To make the oil absorption rate of the housing 7 low, housing 7 should preferably be formed of a resin composition having a high degree of crystallinity, i.e., a resin composition whose rate of crystalline region of regular patterns of molecules is more than a predetermined level. Resin crystallinity of more than the predetermined level means high density of the resin structure, which will hardly absorb lubricating oil. A closer examination has shown that a resin composition having a crystallinity of 20% or more can achieve the low oil absorption rate required of the housing 7. The percent crystallinity was determined with DSC (differential scanning calorimetry) by quantifying the heat of melting. The test was conducted in a temperature range of from −100° C. to +30° C. relative to the melting temperature of the resin at a temperature rise rate of 5 to 10° C./min. The percent crystallinity Xc(%) is obtained by substituting the heat of melting ΔHm obtained from the test and the heat of melting ΔH° when the crystallinity is 100% into the following equation:

$$Xc(\%) = \Delta Hm / \Delta H^\circ \times 100.$$

ΔH° may be any known value shown in various publications such as "Polymer Handbook: Polymer Basics", The Society of Polymer Science, Japan, 1996, Baifukan, or "Thermal Analysis", B. Wunderlich, 1990, Academic Press.

For example, it is 46 KJ/mol for Nylon 66, 41.5 KJ/mol for nylon 11, and 26.9 KJ/mol for PET.

Crystallinity can be determined not only with DSC but also by a specific gravity method or an X-ray diffraction method.

[Low Water Absorption Rate]

Another requirement for the resin composition constituting the housing 7 is low water absorption rate. High water absorption rate means poor stability in dimensions, which will lead to complications in the assembling of the housing into the motor and the problem of large torque. Thus the water absorption rate should preferably be as low as possible, e.g., 0.5% or lower, more preferably 0.1% or lower. The water absorption rate here means the rate of change in the weight before and after a test conducted in accordance with the JIS K7209 test method or the ASTM D570 test method for water absorption of plastics, after standing for 24 hours in water of a temperature of 23° C.

[Low Linear Expansivity]

Yet another requirement for the resin composition constituting the housing 7 is low linear expansivity. Large expansion of the housing 7 by a temperature rise because of the heat generated during operation of the bearing causes deformation of the bearing sleeve 8, resulting in precision degradation of the dynamic-pressure generating grooves. To prevent this, the housing 7 should preferably be formed of a resin composition having a low linear expansion coefficient of, e.g., $5 \times 10^{-5}/°$ C. or less.

[High Rigidity]

The housing 7 must have high rigidity to secure its precision. In this respect, it is preferable to mix reinforcing additives such as glass fiber, carbon fiber, potassium titanate fiber, and the like in the resin composition constituting the housing 7. While it is desirable that it contain as much reinforcing material as possible for the enhancement of its rigidity, too much additives will lower the flowability of molten resin, thereby deteriorating the operability of the resin molding process. The above mentioned linear expansion coefficient will also be affected by the mixing ratio of the reinforcing material. Taking account of all these factors, the reinforcing material should preferably be mixed in a range of from 10 to 80 parts by weight, preferably from 15 to 40 parts by weight with respect to 100 parts by weight of the resin composition.

[Low Sliding Friction Properties]

The housing 7 should also have low sliding friction properties because the lower end surface 2a of the shaft member 2 makes direct sliding contact with the bottom part 7c of the housing 7 as described in the foregoing. In this respect, it is preferable to mix solid lubricant such as graphite, PTFE, molybdenum disulfide in a range of from 5 to 30, preferably 5 to 20 parts by weight with respect to 100 parts by weight of the resin composition constituting the housing 7.

Nylon 66 is a good example of the resin composition that can satisfy all the requirements described above. Thus, the housing 7 may be formed of 100 parts by weight of nylon 66 to which 30 parts by weight of glass fiber and 10 parts by weight of PTFE have been mixed.

The present invention can be applied to any dynamic bearing device whose is made of a resin composition. The shape of the housing or the structure of the are not limited to the illustrated examples. The invention can also be applied to a device in which the thrust bearing part T provides non-contact support by fluid pressure created in the thrust bearing gap.

The invention is also applicable to other fluid bearing devices in which radial parts are configured as cylindrical bearings whose radial bearing surfaces form a true

What is claimed is:

1. A fluid bearing device comprising:
   a housing; and
   a bearing sleeve fixed to an inner periphery of said housing, said bearing sleeve forming a radial bearing gap with respect to an outer peripheral surface of a shaft member,
   said fluid bearing device supporting said shaft member and said bearing sleeve in a radial direction in a non-contact manner by an oil film formed in said radial bearing gap,
   wherein said housing is formed of a resin composition having a crystallinity of 20% or more, and
   wherein said housing includes a cylindrical body part having opening opposite ends, a bottom part for closing one end of said body part, and a sealing portion provided to the other end of said body part for forming a sealing gap with respect to the outer peripheral surface of said shaft member,
   wherein said body part is formed of a resin composition comprising a thermoplastic resin as a base resin and a reinforcing material mixed thereto.

2. A fluid bearing device according to claim 1, wherein said housing is a resin product formed by welding a plurality of parts together.

3. A fluid bearing device according to claim 2, wherein said plurality of parts are formed of mutually different resin compositions.

4. A fluid bearing device according to claim 3, wherein said different resin compositions contain a common base resin material.

5. A fluid bearing device according to claim 1, wherein at least said body part is molded with said bearing sleeve as an insert piece.

6. A fluid bearing device according to claim 1, wherein said body part, said sealing portion, and said bottom part are separately prepared and welded together to form said housing.

7. A fluid bearing device according to claim 1, wherein said body part and either one of said bottom part and said sealing portion are pre-formed as one-piece, to which the other one of said bottom part and said sealing portion is welded to form said housing.

8. A fluid bearing device according to claim 1, wherein said housing includes a cylindrical body part, a bottom part for closing one end of said body part, and a sealing portion provided to the other end of said body part for forming a sealing gap with respect to the outer peripheral surface of said shaft member, and wherein a thrust bearing part is provided on said bottom part of the housing for supporting a lower end surface of said shaft member in a thrust direction, the fluid bearing device further comprising a connecting groove that communicates said thrust bearing part to said sealing portion.

9. A fluid bearing device according to claim 8, wherein said connecting groove comprises a first radial groove provided between said bottom part of the housing and one end surface of said bearing sleeve, an axial groove provided between an inner peripheral surface of said housing and an outer peripheral surface of said bearing sleeve, and a second radial groove provided between an inner surface of said sealing portion and the other end surface of said bearing sleeve.

10. A fluid bearing device comprising:
    a housing; and
    a bearing sleeve made of sintered metal and fixed to an inner periphery of said housing, said bearing sleeve forming a radial bearing gap with respect to an outer peripheral surface of a shaft member, said fluid bearing device supporting said shaft member and said bearing sleeve in a radial direction in a non-contact manner by an oil film formed in said radial bearing gap, wherein said housing is formed of a resin composition having a crystallinity of 20% or more, wherein said resin composition contains a reinforcing material in a range of from 10 to 80 parts by weight with respect to 100 parts by weight of said resin composition.

11. A fluid bearing device according to claim 10, wherein said resin composition has a water absorption rate of 0.5% or less.

12. A fluid bearing device according to claim 10, wherein said resin composition has a linear expansion coefficient of $5 \times 10^{-5}$/° C. or less.

13. A fluid bearing device according to claim 10, wherein said shaft member is supported in a thrust direction in a non-contact manner by an oil film formed in a thrust bearing gap.

14. A fluid bearing device according to claim 10, wherein said shaft member is supported in a thrust direction by making contact with said bottom part of the housing.

15. A fluid bearing device according to claim 10, wherein said housing is molded with said bearing sleeve as an insert piece.

16. A fluid bearing device comprising:

a housing; and a bearing sleeve made of sintered metal and fixed to an inner periphery of said housing, said bearing sleeve forming a radial bearing gap with respect to an outer peripheral surface of a shaft member, said fluid bearing device supporting said shaft member and said bearing sleeve in a radial direction in a non-contact manner by an oil film formed in said radial bearing gap, wherein said housing is formed of a resin composition having a crystallinity of 20% or more, wherein said resin composition contains a solid lubricant in a range of from 5 to 30 parts by weight with respect to 100 parts by weight of said resin composition.

17. A fluid bearing device comprising:

a housing made of a resin having a bottom part at one end thereof;

a bearing sleeve made of metal provided inside said housing;

a shaft member inserted in a space formed by an inner peripheral surface of said bearing sleeve;

a radial bearing part provided between said inner peripheral surface of the bearing sleeve and an outer peripheral surface of said shaft member for supporting said shaft member in a radial direction in a non-contact manner by a lubricating oil film formed in a bearing gap; and a thrust bearing part provided on said bottom part of the housing for supporting one end surface of said shaft member in thrust direction, wherein said housing is molded by a resin with said bearing sleeve as an insert piece, and said bearing sleeve includes a chamfered portion at least at an inner peripheral portion at one end thereof, said chamfered portion being provided with separation prevention means for preventing separation of the resin forming said housing therefrom.

18. A fluid bearing device according to claim 17, wherein said separation prevention means is provided by forming said bearing sleeve from sintered metal and by making said chamfered portion to have a larger surface porosity rate than that of said inner peripheral surface of the bearing sleeve.

19. A fluid bearing device according to claim 17, wherein said separation prevention means is provided by forming said chamfered portion to have a larger surface roughness than that of said inner peripheral surface of the bearing sleeve.

20. A fluid bearing device according to claim 17, wherein said chamfered portion is formed with a recess.

21. A fluid bearing device comprising:

a housing; and a bearing sleeve fixed to an inner periphery of said housing, said bearing sleeve forming a radial bearing gap with respect to an outer peripheral surface of a shaft member, wherein said shaft member has an indent-ring region with a small radius, said fluid bearing device supporting said shaft member and said bearing sleeve in a radial direction in a non-contact manner by an oil film formed in said radial bearing gap, wherein said housing is a resin product.

22. A fluid bearing device comprising:

a housing; and a bearing sleeve fixed to an inner periphery of said housing, said bearing sleeve forming a radial bearing gap with respect to an outer peripheral surface of a shaft member, said fluid bearing device supporting said shaft member and said bearing sleeve in a radial direction in a non-contact manner by an oil film formed in said radial bearing gap, wherein said housing is formed of a resin composition having a crystallinity of 20% or more, and wherein said housing includes a cylindrical body part having opening opposite ends, a bottom part for closing one end of said body part, and a sealing portion provided to the other end of said body part for forming a sealing gap with respect to the outer peripheral surface of said shaft member, wherein said bottom part is formed of a resin composition comprising a thermoplastic resin as a base resin and a solid lubricant mixed thereto.

23. A fluid bearing device comprising:

a housing; and a bearing sleeve fixed to an inner periphery of said housing, said bearing sleeve forming a radial bearing gap with respect to an outer peripheral surface of a shaft member, said fluid bearing device supporting said shaft member and said bearing sleeve in a radial direction in a non-contact manner by an oil film formed in said radial bearing gap, wherein said housing is formed of a resin composition having a crystallinity of 20% or more, and wherein said housing includes a cylindrical body part having opening opposite ends, a bottom part for closing one end of said body part, and a sealing portion provided to the other end of said body part for forming a sealing gap with respect to the outer peripheral surface of said shaft member, wherein said sealing portion is formed of a resin composition comprising a thermoplastic resin as a base resin and having a water contact angle of 80° or more.

* * * * *